United States Patent
Hahn et al.

(10) Patent No.: US 10,334,653 B2
(45) Date of Patent: Jun. 25, 2019

(54) METHOD FOR PERFORMING INITIAL ACCESS IN WIRELESS COMMUNICATION SYSTEM AND DEVICE FOR SAME

(71) Applicant: LG ELECTRONICS INC., Seoul (KR)

(72) Inventors: Genebeck Hahn, Seoul (KR); Heejeong Cho, Seoul (KR); Eunjong Lee, Seoul (KR); Ilmu Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/549,825

(22) PCT Filed: Jul. 27, 2015

(86) PCT No.: PCT/KR2015/007811
§ 371 (c)(1),
(2) Date: Aug. 9, 2017

(87) PCT Pub. No.: WO2016/140409
PCT Pub. Date: Sep. 9, 2016

(65) Prior Publication Data
US 2018/0049263 A1    Feb. 15, 2018

Related U.S. Application Data

(60) Provisional application No. 62/128,486, filed on Mar. 4, 2015.

(51) Int. Cl.
*H04W 76/15* (2018.01)
*H04W 24/10* (2009.01)
(Continued)

(52) U.S. Cl.
CPC ........... *H04W 76/15* (2018.02); *H04W 24/10* (2013.01); *H04W 48/16* (2013.01); *H04W 72/12* (2013.01);
(Continued)

(58) Field of Classification Search
CPC ..... H04W 76/15; H04W 76/10; H04W 24/10; H04W 48/16; H04W 72/12; H04W 88/08;
(Continued)

(56) References Cited

U.S. PATENT DOCUMENTS

2007/0149226 A1    6/2007  de Vries
2010/0130206 A1    5/2010  Chin et al.
(Continued)

FOREIGN PATENT DOCUMENTS

KR    10-2008-0086867 A    9/2008
KR    10-2010-0108464 A    10/2010
(Continued)

*Primary Examiner* — Kibrom T Hailu
(74) *Attorney, Agent, or Firm* — Birch, Stewart, Kolasch & Birch, LLP

(57) ABSTRACT

A method for supporting by a temporarily serving base station an initial access of a terminal in a wireless communication system, according to an embodiment of the present invention, comprises the steps of: determining whether or not a terminal, which requests a radio resource control (RRC) connection establishment for an initial access, supports a predetermined service; if the terminal supports the predetermined service, requesting a load status report to candidate base stations that can be accessed by the terminal; requesting to the candidate base stations multiple connection establishment with the terminal on the basis of the load status report obtained from the candidate base stations; determining a base station for establishing of serving link with the terminal on the basis of the response to the multiple connection establishment request; and transmitting to the terminal an RRC connection establishment response mes- (Continued)

sage which comprises information about the base station for the establishment of the serving link.

8 Claims, 13 Drawing Sheets

(51) Int. Cl.
| | |
|---|---|
| *H04W 88/08* | (2009.01) |
| *H04W 48/16* | (2009.01) |
| *H04W 72/12* | (2009.01) |
| *H04W 76/10* | (2018.01) |
| *H04W 76/30* | (2018.01) |
| *H04W 84/04* | (2009.01) |
| *H04W 88/02* | (2009.01) |

(52) U.S. Cl.
CPC .......... *H04W 88/08* (2013.01); *H04W 76/10* (2018.02); *H04W 76/30* (2018.02); *H04W 84/042* (2013.01); *H04W 88/02* (2013.01)

(58) Field of Classification Search
CPC ... H04W 76/30; H04W 84/042; H04W 88/02; H04W 36/18; H04W 76/025; H04W 76/046; H04W 76/27; H04L 1/0668
See application file for complete search history.

(56) References Cited

U.S. PATENT DOCUMENTS

| | | | |
|---|---|---|---|
| 2013/0183971 A1* | 7/2013 | Tamaki | H04W 36/0061 |
| | | | 455/436 |
| 2013/0229942 A1* | 9/2013 | Kubota | H04W 36/22 |
| | | | 370/252 |
| 2014/0056243 A1 | 2/2014 | Pelletier et al. | |
| 2014/0092866 A1* | 4/2014 | Teyeb | H04W 36/24 |
| | | | 370/331 |
| 2014/0213249 A1 | 7/2014 | Kang et al. | |
| 2015/0065131 A1* | 3/2015 | Chuang | H04W 60/00 |
| | | | 455/435.3 |
| 2015/0163773 A1 | 6/2015 | Wang et al. | |
| 2016/0029401 A1* | 1/2016 | Fukuta | H04W 72/1205 |
| | | | 370/329 |
| 2016/0174282 A1* | 6/2016 | Grant | H04W 36/0033 |
| | | | 455/422.1 |
| 2016/0219475 A1* | 7/2016 | Kim | H04L 5/00 |
| 2016/0242128 A1* | 8/2016 | Loehr | H04W 52/34 |

FOREIGN PATENT DOCUMENTS

| | | |
|---|---|---|
| KR | 10-2011-0068331 A | 6/2011 |
| KR | 10-2012-0072313 A | 7/2012 |
| KR | 10-2012-0082739 A | 7/2012 |
| KR | 10-2014-0095912 A | 8/2014 |
| KR | 10-2015-0005458 A | 1/2015 |
| KR | 10-2015-0018285 A | 2/2015 |
| KR | 10-2015-0020510 A | 2/2015 |

* cited by examiner

FIG. 1
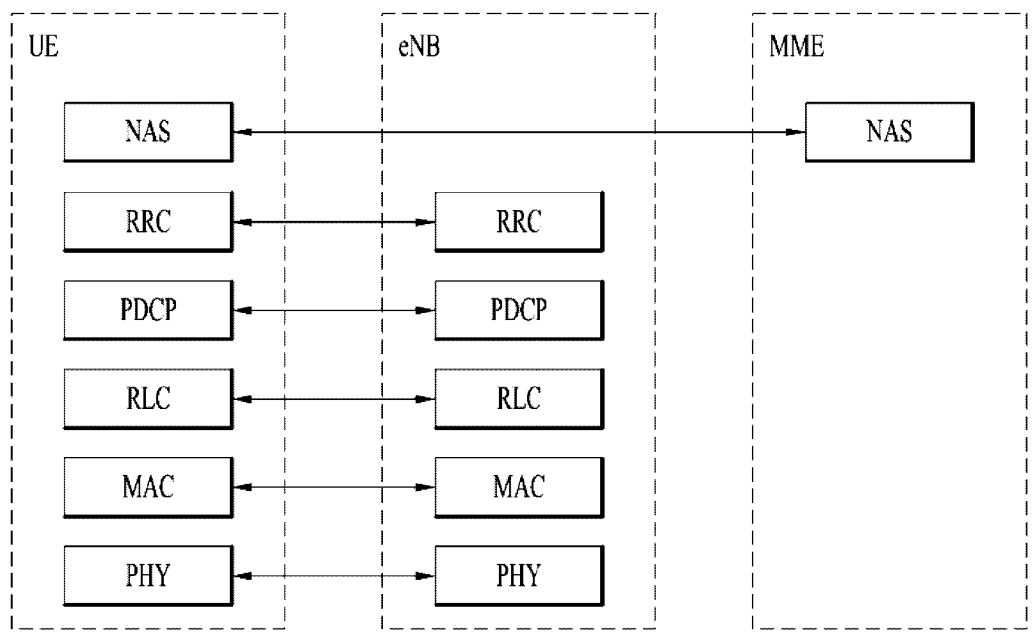
(a) Control-Plane Protocol Stack
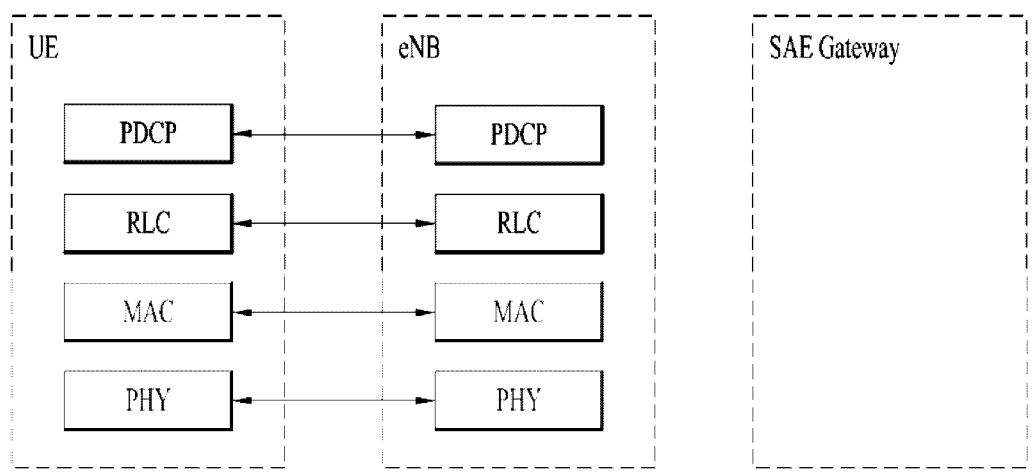
(b) User-Plane Protocol Stack

METHOD FOR PERFORMING INITIAL ACCESS IN WIRELESS COMMUNICATION SYSTEM AND DEVICE FOR SAME

CROSS REFERENCE TO RELATED APPLICATIONS

This application is the National Phase of PCT International Application No. PCT/KR2015/007811, filed on Jul. 27, 2015, which claims priority under 35 U.S.C. 119(e) to U.S. Provisional Application No. 62/128,486, filed on Mar. 4, 2015, all of which are hereby expressly incorporated by reference into the present application.

TECHNICAL FIELD

The present invention relates to a wireless communication system, and more particularly, to a method for a user equipment to perform initial access for establishing multiple connections via a base station and an apparatus therefor.

BACKGROUND ART

Recently, in order to implement a next generation mobile communication, e.g., 5G mobile communication, discussion on highly reliable communication is in progress. An MCS (mission critical service) corresponding to an example of the highly reliable communication requires error free transmission. An M2M communication field also requires the necessity of the highly reliable communication as a method of satisfying real-time for traffic safety, traffic efficiency, efficient industrial communication, and the like. The highly reliable communication can be utilized in various fields such as an application, a medical/emergency response, remote controlling, sensing, and the like sensitive to delay.

According to the MCSs discussed in 3GPP standardization meeting, it is able to expect that there may exist more improvement in End-to-End Latency, Ubiquity, Security, Availability/Reliability compared to legacy UMTS/LTE, and LTE-A/Wi-Fi. The currently proposed commercial radio technologies (e.g., 3GPP LTE, LTE-A) are unable to satisfy the requirements of the MCS in terms of the real time and the reliability. Meanwhile, an evaluation criterion for communication reliability can be defined according to various schemes. For example, the evaluation criterion can be defined by quality of wireless connection that satisfies a level of a specific service, by which the present invention may be non-limited.

In order to implement highly reliable communication for MCSs, it is required to have improvement in a method of sensing and controlling a radio link, a method of controlling dualization of a radio link connection, a method of promptly recovering a radio link connection, a method of managing a security key for safe wireless transmission, authentication, a method of protecting a personal privacy, and the like. To this end, discussion on a method of quickly searching for an available alternative link near a user equipment and managing the link in consideration of power consumption, a method of improving reliability/availability in providing a service via an optimized radio link connection, a method of minimizing service interruption time for a user equipment via quick recovery when a radio link is disconnected, a method of implementing safe communication by preventing intentional radio link damage, and the like is in progress.

DISCLOSURE OF THE INVENTION

Technical Task

A technical task of the present invention is to provide a method for a user equipment to quickly and efficiently configure multiple links including a serving link and an alternative link when the user equipment performs an initial access.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

In an aspect of this invention to achieve the technical task, a method of supporting an initial access of a user equipment by a temporary serving base station in a wireless communication system, includes determining whether or not the user equipment requesting a radio resource control (RRC) connection setup for the initial access supports a predetermined service, if the user equipment supports the predetermined service, requesting a report on a load status to candidate base stations to which the user equipment is able to access, requesting multi-connection setup with the user equipment to the candidate base stations according to the report on the load status obtained from the candidate base stations, determining a base station for setting a serving link with the user equipment based on a response for the multi-connection setup request, and transmitting an RRC connection setup response message including information on the base station for setting the serving link to the user equipment.

Preferably, the method can further include broadcasting system information including a plurality of thresholds for the predetermined service, a maximum number of multiple links for the predetermined service, and a list of neighboring base stations of the temporary serving base station.

More preferably, the plurality of thresholds can include at least one of a first threshold indicating quality of the serving link for searching for a first alternative link to replace the serving link, a second threshold indicating a quality of the serving link for releasing an RRC connection of the serving link, a third threshold indicating quality of the first alternative link for searching for a second alternative link to replace the first alternative link, and a fourth threshold indicating a quality of the first alternative link for releasing an RRC connection of the first alternative link.

More preferably, the method can further include receiving an RRC connection setup request message including an indicator indicating whether or not the user equipment supports the predetermined service and a list of the candidate base stations to which the user equipment is able to access. The candidate base stations can be selected based on the list of the neighboring base stations transmitted by the temporary serving base station.

And, the report on the load status can indicate a load status of the candidate base stations estimated for a future timing.

Preferably, determining the base station for setting the serving link may include determining a base station of a lowest load status among candidate base stations which have accepted the multi-connection setup request, and the temporary serving base station.

Preferably, remaining base stations other than the base station for setting the serving link among the candidate base stations having accepted the multi-connection setup request and the temporary serving base station, can configure an alternative link with the user equipment in a unicast data transmission/reception inactive mode. More preferably, if quality of the serving link is equal to or less than a threshold, unicast data transmission/reception of the alternative link can be activated according to a request of the user equipment or a request of the base station for setting the serving link.

Preferably, an RRC connection setup completion message of the user equipment can be transmitted to the base station for setting the serving link with the user equipment in response to the RRC connection setup response.

In other aspect of this invention to achieve the technical task, a method of performing an initial access by a user equipment in a wireless communication system, includes transmitting a radio resource control (RRC) connection setup request message including candidate base stations to which the user equipment is able to access and an indicator indicating a predetermined service supported by the user equipment to a temporary serving base station, receiving an RRC connection setup response message including information on a base station for setting a serving link among the temporary serving base station and the candidate base stations, and transmitting an RRC connection setup completion message in response to the RRC connection setup response message. In this case, the RRC connection setup completion message can be transmitted to the base station for setting the serving link among the temporary serving base station and the candidate base stations.

Preferably, the base station for setting the serving link may correspond to a base station of a lowest load status among the candidate base stations and the temporary serving base station.

Preferably, the method can further include configuring an alternative link with the remaining base stations other than the base station for setting the serving link among the candidate base stations and the temporary serving base station in a unicast data transmission/reception inactive mode. More preferably, if quality of the serving link is equal to or less than a threshold, unicast data transmission/reception of the alternative link can be activated according to a request of the user equipment or a request of the base station for setting the serving link.

In another aspect of this invention to achieve the technical task, a temporary serving base station supporting an initial access of a user equipment in a wireless communication system can include a processor configured to determine whether or not the user equipment requesting a radio resource control (RRC) connection setup for the initial access supports a predetermined service, to request a report on a load status to candidate base stations to which the user equipment is able to access if the user equipment supports the predetermined service, to request multi-connection setup with the user equipment to the candidate base stations according to the report on the load status obtained from the candidate base stations, and to determine a base station for setting a serving link with the user equipment based on a response for the multi-connection setup request, and a transmitter configured to transmit an RRC connection setup response message including information on the base station for setting the serving link to the user equipment.

Advantageous Effects

According to one embodiment of the present invention, since a base station of a serving link is determined according to a load state rather than a base station randomly accessed by a user equipment, it is able to quickly and efficiently configure multiple links including a serving link and an alternative link when the user equipment performs initial access.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

FIG. 1 is a diagram illustrating structures of a control plane and a user plane of a radio interface protocol between a user equipment and E-UTRAN based on the 3GPP radio access network standard;

BEST MODE

Mode for Invention

Figure 2:
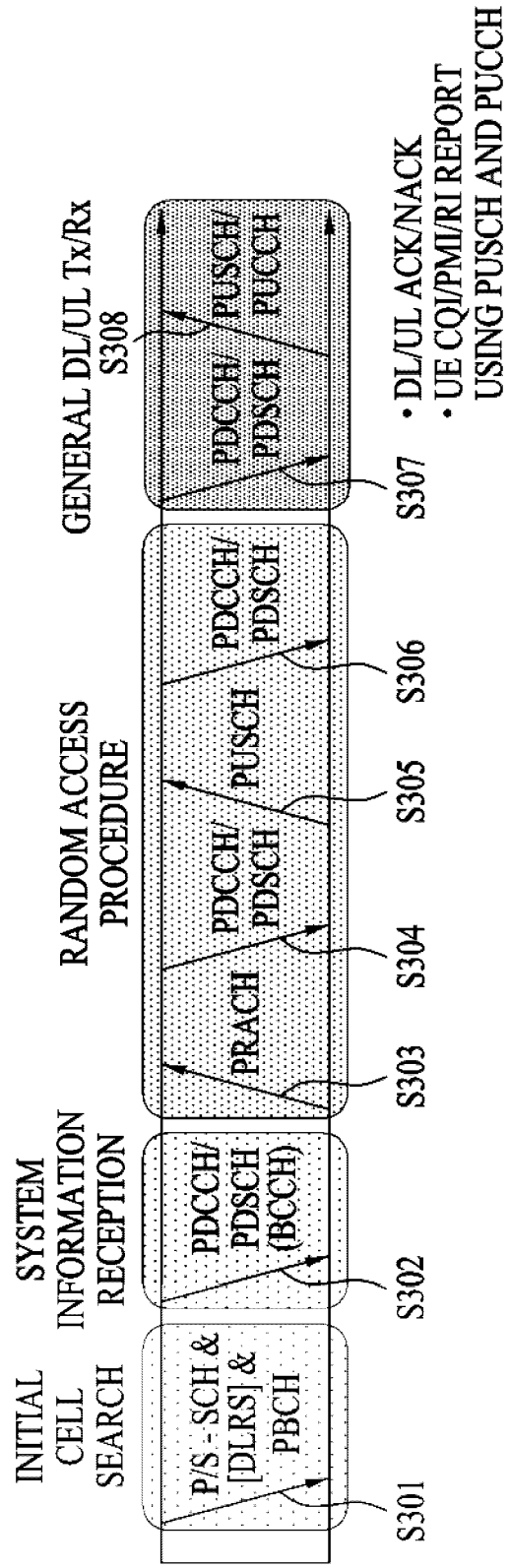
FIG. 2 is a diagram illustrating physical channels used in a 3GPP LTE system and a general method for transmitting a signal using the physical channels.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

FIG. 1 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

One cell constituting a base station eNB is set to one of bandwidths of 1.4, 3.5, 5, 10, 15, and 20 MHz and provides a downlink or uplink transmission service to several UEs. At this time, different cells may be configured to provide different bandwidths.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

FIG. 2 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DLRS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 3:
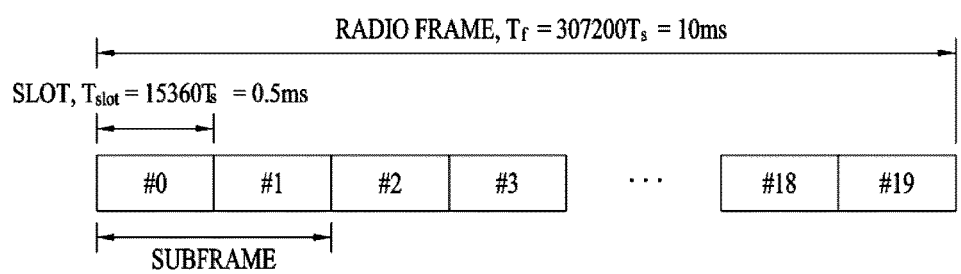
FIG. 3 is a diagram illustrating a structure of a radio frame used in an LTE system.

FIG. 3 is a diagram illustrating the structure of a radio frame used in an LTE system.

Referring to FIG. 3, the radio frame has a length of 10 ms (327200×$T_s$) and includes 10 equal-sized subframes. Each of the subframes has a length of 1 ms and includes two slots. Each slot has a length of 0.5 ms (15360 $T_s$). In this case, $T_s$ denotes a sampling time represented by $T_s$=1/(15 kHz× 2048)=3.2552×$10^{-8}$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 4:
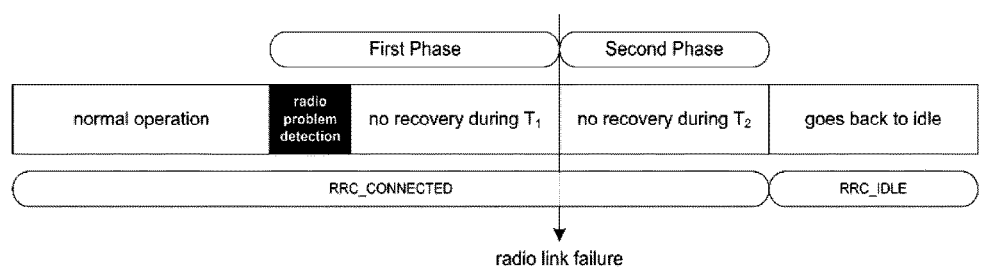
FIG. 4 is a diagram illustrating a radio link failure in LTE system.

FIG. 4 is a diagram illustrating a radio link failure in LTE system.

A radio link failure (RLF) may occur between a base station and a user equipment. The RLF corresponds to a state that it is difficult to transmit and receive a signal between a base station and a user equipment due to degradation of quality of a radio link between the base station and the user equipment. In the following, a procedure of detecting an RLF and a procedure of searching for a new radio link are explained.

In 3GPP LTE system, a radio resource control (RRC) state between a base station and a user equipment can be classified into RRC_CONENCTED state and RRC_IDLE state. The RRC_CONENCTED state corresponds to a state that an RRC connection is established between the base station and the user equipment. Hence, the user equipment can transceive data with the base station. The RRC_IDLE state corresponds to a state that an RRC connection is released between the base station and the user equipment.

An operation related to the RLF may include (1) detection of physical layer problems in the RRC_CONNECTED state, (2) recovery of physical layer problems, and (3) RLF detection.

(1) If a user equipment continuously receives "out-of-sync" indications from a lower layer as many as a prescribed value defined by N310, the user equipment drives a timer defined as T310. The "out-of-sync" indications can be provided to a higher layer when it is impossible to demodulate PDCCH received by a lower layer (physical layer) or when SINR (signal-to-interference plus noise ratio) is low. The N310 and the T310 correspond to higher layer parameters and can be given by a predefined value.

(2) If the user equipment receives continuous "in-sync" indications from the lower layer as many as a prescribed value defined by N311 while the T310 timer is driving, the user equipment stops the T310 timer. The N311 corresponds to a higher layer parameter and can be given by a predefined value. If the T310 timer is stopped, RRC connection is maintained without explicit signaling.

(3) On the contrary, if the T310 timer is expired, a random access problem indication is received from MAC layer, or an indication indicating the excess of the maximum retransmission number for an SRB (signaling radio bearer) or a DRB (data radio bearer) is received from RLC, the user equipment determines it as an RLF is detected. If the RLF is detected, the user equipment initiates a connection re-establishment procedure. If the T310 timer is expired, it indicates that the T310 timer arrives at determined time (T310) without stopping in the middle of driving the T310 timer. The connection re-establishment procedure corresponds to a procedure that the user equipment transmits an 'RRC connection re-establishment request' message to a base station, receives an 'RRC connection re-establishment' message from the base station, and transmits an 'RRC connection re-establishment completion' message to the base station. For details about the RLF-related operation, it may refer to the paragraph 5.3.11 of 3GPP standard document TS36.331.

As mentioned in the foregoing description, when a link status between a transmitter and a receiver is deteriorated, the RLF procedure may correspond to a procedure that a user equipment searches for a new link while operating an internal timer. In a system according to legacy 3GPP LTE standard, since it is difficult to anticipate a link (Uu link) between a base station and a user equipment, as mentioned in the foregoing description, it is able to determine whether or not an RLF is detected based on such a parameter as N310, N311, T310, or the like.

In particular, when an RLF is controlled based on a plurality of timers, although a user equipment recognizes a physical layer problem, the user equipment is able to determine an RLF only when a set timer (e.g., T310, T312) is expired. Subsequently, the user equipment performs an RRC connection re-establishment procedure. The user equipment starts a T311 timer while performing the RRC connection re-establishment procedure, If the user equipment fails to reestablish an RRC connection before the T311 timer is expired, the user equipment is switched to an RRC idle state.

Since the current LTE/LTE-A system is designed to conservatively process recovery from an RLF, it is difficult to search for an available link capable of being promptly replaced according to a channel state of a user equipment and it is difficult to secure an available alternative link for switching a connection to an alternative link. Hence, it is difficult for LTE system to satisfy reliability for MCSs. Since LTE/LTE-A system assumes a relatively good connectivity, if the LTE/LTE-A system experiences severe interference or a network resource is in an overload state, a considerably low transfer rate is provided.

However, as mentioned in the foregoing description, the next generation mobile communication should satisfy a rate of error occurrence equal to or less than $10^{-6}$ and reliability requirement equal to or less than $10^{-6}$. Hence, it is necessary to construct a highly reliable system capable of providing MCSs to a user equipment at all times while the user equipment does not recognize a disconnection of a radio link.

For example, a service of 5G mobile communication environment applicable to MCS may include remote controlling of a robot arm for industry automation, physical distribution delivery via remote controlling of AGVs (automated guided vehicles), remote medical service, drone remote control, information exchange between vehicles for providing autonomous driving service, transmission of a signal to indicate a hidden vehicle or a forward collision not detected by a sensor (e.g., camera, radar) of a vehicle, and the like, by which the present invention may be non-limited.

In order to seamlessly provide services, it is necessary for a user equipment to search for an alternative link and secure the link in advance for a case that connection quality of a serving link is deteriorated. If the quality of the serving link is degraded as much as quality not appropriate for MCSs, the user equipment should quickly switch to the alternative link. In particular, it is necessary for the user equipment to more quickly determine quality deterioration of the serving link, secure the alternative link before an RLF occurs, and switch to the alternative link.

In the following, when a user equipment searches for an alternative link and maintains the alternative link except a link used by the user equipment, it means that the user equipment has radio links satisfying minimum QoE for MCSs in a specific geographical region.

It may consider that radio link availability of LTE/LTE-A system definitely depends on a probability provided by network coverage. LTE/LTE-A system assumes that BER (block error rate) $10^{-1}$ is applied to unicast transmission transmitted via PDSCH and sufficient reliability is provided via HARQ retransmission without distinction between C-plane and U-plane. Yet, in order to provide MCSs through 5G mobile communication environment, it is necessary for a user equipment to secure an alternative link at all times while satisfying target reliability of MCSs by always maintaining the alternative link.

Meanwhile, according to the present invention, since it is difficult for a network to indicate an available alternative link one by one according to surrounding of a user equipment, the network indicates the user equipment to autonomously utilize radio links near the user equipment. For example, it may consider a method of avoiding disconnection of a radio link for providing MCS by making the user equipment search for available alternative links near the user equipment and secure the links. Yet, the user equipment is unable to know whether or not the secured serving link and the alternative links satisfy reliability required for the MCSs. Hence, it is necessary to have a method of searching for alternative links satisfying the reliability for the MCSs and maintaining the links.

In the following, an indicator indicating reliability for MCS is referred to as RLA (radio link availability). When QoE (quality of experience) of a user equipment is represented in the aspect of link quality, the RLA can be defined as equation 1.

$$RLA = Pr(RLQ \geq QoE) \quad \text{[Equation 1]}$$

In the equation 1, RLQ denotes measured radio link quality and QoE denotes a QoE requirement condition in terms of link quality.

The embodiments of the present invention can be classified as follows. A detail user equipment operation for each configuration shall be described in the following.

A procedure of searching for an alternative link based on a threshold value when quality of serving link base station is degraded.

A procedure that a user equipment notifies an alternative link to a serving link base station and unicast data transmission and reception configure RRC connection with the alternative link in an inactive mode.

A procedure of searching for a different alternative link and securing the link according to quality change of a searched alternative link base station.

Searching for Alternative Link and Connection Setup According to Quality Degradation of Serving Link Base Station The present invention proposes a method for a user equipment to promptly recognize deterioration of quality of a serving link and search for an alternative link. In order to determine degradation of signal quality of a link, threshold values described in the following are defined.

First threshold value ($S_{MCS\_U}$): upper limit threshold defined for serving link quality (trigger point for searching for alternative link)

Second threshold value ($S_{MCS\_L}$): lowest limit threshold defined for serving link quality (trigger point for switching to alternative link)

Third threshold value ($A_{MCS\_U}$): upper limit threshold defined for alternative link quality (trigger point for searching for different alternative link)

Fourth threshold value ($A_{MCS\_L}$): lowest limit threshold defined for alternative link quality (trigger point for switching to different alternative link)

The abovementioned threshold values can be shared between a base station and a user equipment via user equipment-dedicated RRC signaling. SIB or the user equipment-dedicated RRC signaling can further include dedicated carrier information for MCSs.

It is preferable to configure the threshold values to satisfy a target BER of a physical layer for MCSs. For example, if a target BER of an MCS corresponds to $10^{-9} \sim 10^{-6}$, an MCS threshold value corresponding to the BER $10^{-9}$ is configured as a first threshold value and an MCS threshold value corresponding to the BER $10^{-6}$ can be configured as a second threshold value.

In the following, a relation between the abovementioned threshold value and an RSRP/RSRQ threshold for handover is explained. A second threshold value ($S_{MCS\_L}$) for releasing a serving link should be configured to be relatively higher than an RSRP/RSRQ threshold for handover. A first threshold value ($S_{MCS\_U}$) of quality degradation of a serving link for searching for an alternative link should be configured to be higher than the second threshold value ($S_{MCS\_L}$) for releasing a serving link. And, a fourth threshold value ($A_{MCS\_L}$) for releasing an alternative link can be configured to be equal to or higher than the first threshold value ($S_{MCS\_U}$) for searching for an alternative link. A third threshold value ($A_{MCS\_U}$) of quality degradation of a secured alternative link for searching for a different alternative link can be configured to be equal to or higher than the fourth threshold value for releasing an alternative link. This can be summarized by equation 2 in the following.

$$RSRP/RSRQ \text{ Threshold} << S_{MCS\_L} < S_{MCS\_U} \leq A_{MCS\_L} \leq A_{MCS\_U} \quad \text{[Equation 2]}$$

Figure 5:
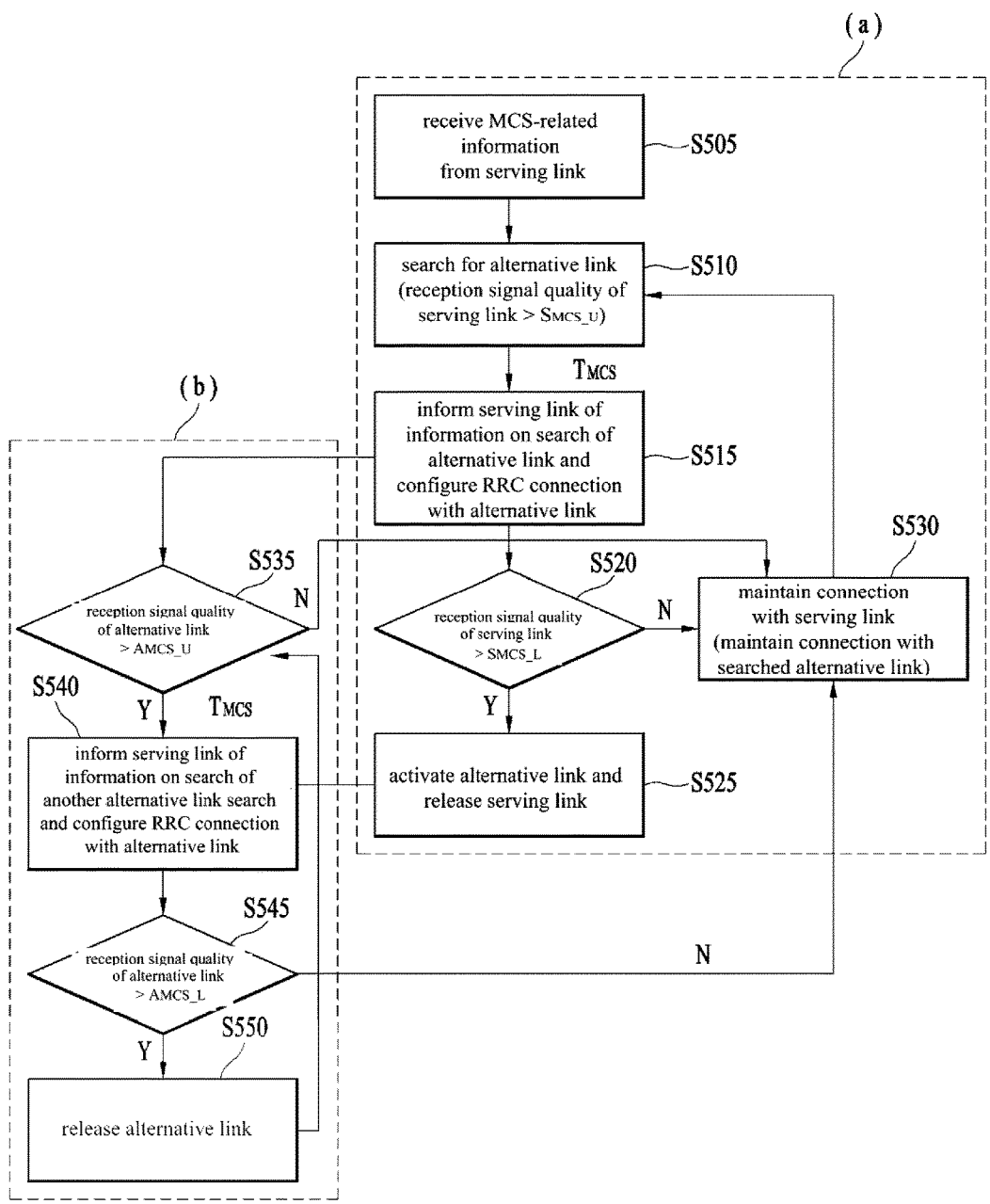
FIG. 5 is a flowchart for a method of searching for an alternative link and updating the alternative link according to one embodiment of the present invention.

FIG. 5 (a) is a flowchart for a method of searching for an alternative link according to one embodiment of the present invention.

Referring to FIG. 5, a user equipment receives service-related information necessary for receiving MCSs from a serving link base station [S505]. The service-related information can include an MCS-dedicated carrier, a serving link quality degradation threshold value, an alternative link quality degradation threshold value, and information on the maximum number of alternative links capable of being searched.

If serving link quality is equal to or less than a first threshold value, the user equipment starts to search for a first alternative link [S510].

If the first alternative link is searched, the user equipment transmits a search result of the first alternative link to the serving link base station [S515]. A base station of the first alternative link and the user equipment configure an RRC connection that unicast data transmission and reception are deactivated.

The user equipment determines whether or not the quality of the serving link is equal to or less than a second threshold value [S520].

If the quality of the serving link is equal to or less than the second threshold, the user equipment activates the RRC connection of the first alternative link and releases the RRC connection from the serving link [S525].

The activation of the first alternative link can be directly indicated by the user equipment. Unlikely, if the user equipment informs the serving link base station that the quality of the serving link is equal to or less than the second threshold value, the serving link base station can ask the base station of the first alternative link to activate the RRC connection.

Figure 6:
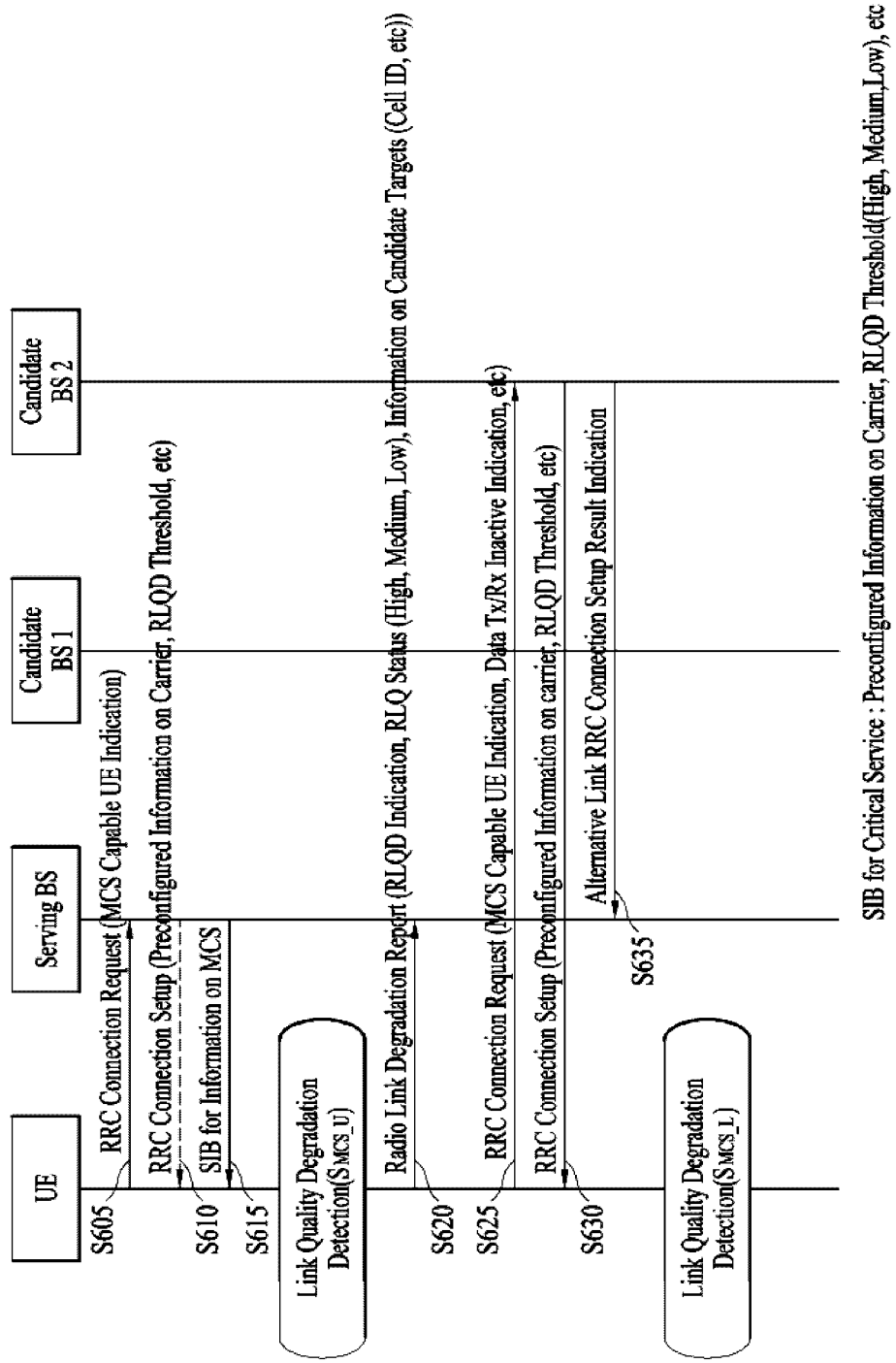
FIG. 6 is a flowchart for an alternative link search procedure of a user equipment according to a different embodiment of the present invention.

FIG. 6 is a flowchart for an alternative link search procedure of a user equipment according to a different embodiment of the present invention.

A user equipment transmits an RRC connection setup request message to a serving link base station [S605]. The RRC connection setup request message includes an indicator indicating that the user equipment corresponds to an MCS capable user equipment.

The serving link base station transmits an RRC connection setup message to the user equipment [S610]. The RRC connection setup message includes a dedicated carrier for MCSs and information on a threshold value (serving link, alternative link) for RLQD (radio link quality degradation).

Meanwhile, the user equipment can transmit an indicator indicating the start and the end of MVSs to the serving link base station (or user equipment). If the user equipment informs the serving link base station of the start of the MCS, the serving link base station is able to know that threshold values for the MCS are applied. If the user equipment informs the serving link base station of the end of the MCS, the serving link base station is able to know that the threshold values for the MCS are not applied anymore.

If serving link quality is equal to or less than a first threshold value ($S_{MCS\_U}$), the user equipment transmits an RLQD report to the serving base station [S620]. The user equipment starts to search for an alternative link. The RLQD report includes a result of the alternative link search. The RLQD report can include an RLQD indicator indicating that serving link quality is equal to or less than the first threshold value, RLQ status information indicating radio link quality as high, medium, and low, and information (e.g., cell ID) on candidate base stations of searched alternative links.

If an alternative link of quality better than quality of the serving link is searched, the user equipment transmits an RRC connection setup request message to a base station of the alternative link [S625]. The RRC connection setup request message transmitted to the base station of the alternative link can include an indicator indicating a mode that unicast data transmission and reception are deactivated. The RRC connection setup request message can include information on the serving link base station.

The alternative link base station transmits an RRC connection setup message to the user equipment [S630].

The alternative link base station transmits a configuration result of the alternative link to the serving link base station [S635]. The alternative link base station can receive a request for activating the alternative link from the serving base station according to quality degradation of the serving link.

Figure 7:
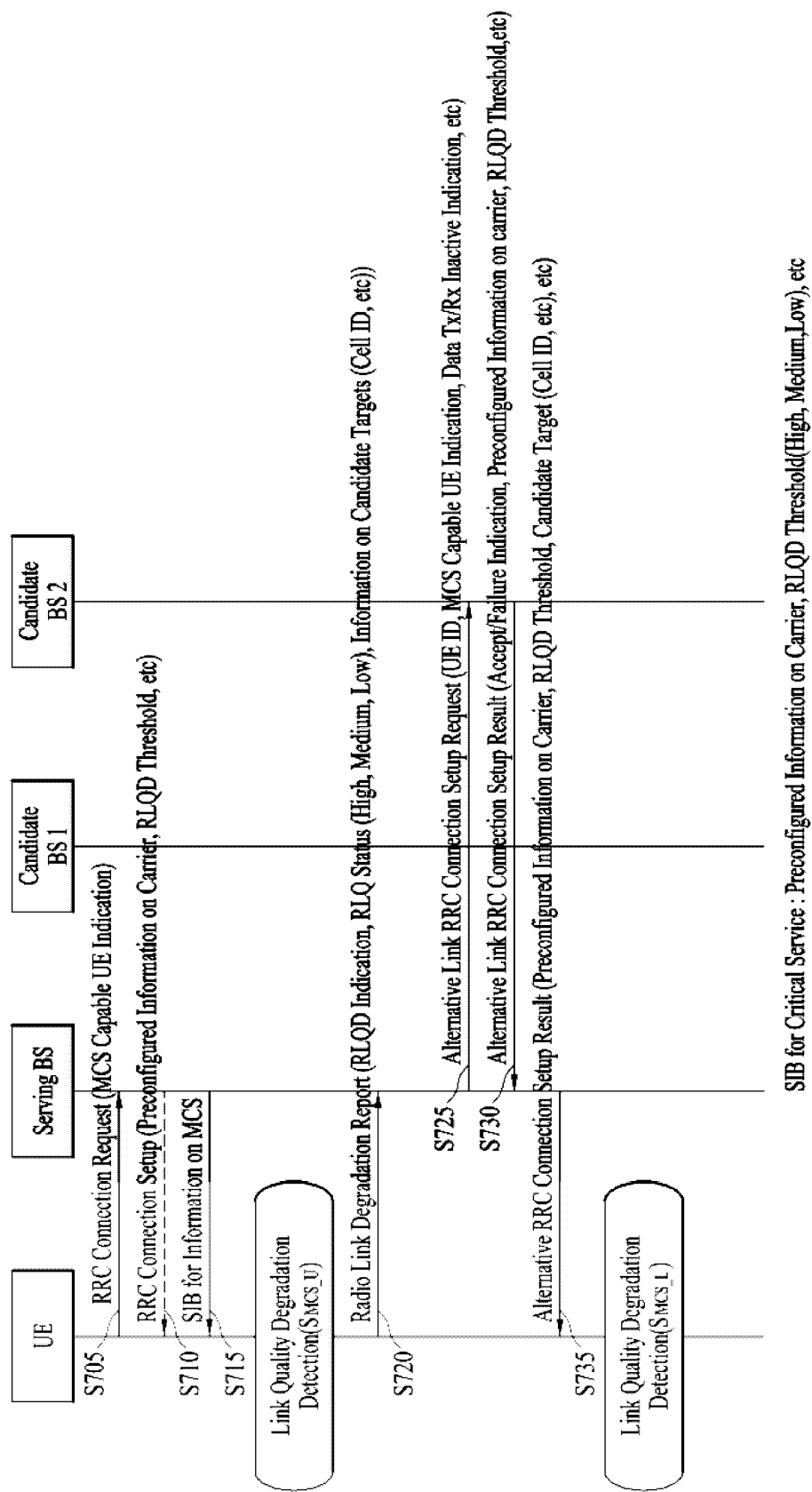
FIG. 7 is a flowchart for an alternative link search procedure of a user equipment according to a further different embodiment of the present invention.

FIG. 7 is a flowchart for an alternative link search procedure of a user equipment according to a further different embodiment of the present invention. Explanation on contents overlapped with the aforementioned contents is omitted. In the embodiment of FIG. 6, a user equipment transmits an RRC connection request to a candidate base station to configure an alternative link. Yet, in the embodiment of FIG. 7, a serving link base station transmits an alternative link connection request to a candidate base station of an alternative link and transmits a result of a response of the candidate base station to the user equipment in response to the alternative link connection request.

Referring to FIG. 7, the user equipment transmits an RRC connection setup request message to the serving link base station [S705]. The serving link base station transmits an RRC connection setup message to the user equipment [S710]. If serving link quality is equal to or less than a first threshold value ($S_{MCS\_U}$), the user equipment transmits an RLQD report to the serving base station [S720]. The user equipment starts to search for an alternative link. The RLQD report includes a result of alternative link search.

The serving link base station transmits an alternative link configuration request to alternative link candidate base stations based on the RLQD report received from the user equipment [S725]. The alternative link configuration request can include an ID of the user equipment, an indicator indicating that the user equipment corresponds to an MCS capable user equipment, and an indicator indicating a transmission/reception inactivation mode.

The serving link base station receives a response from the candidate base station of the alternative link in response to the alternative link configuration request [S730]. The response, which is received in response to the alternative link configuration request, can include an indicator indicating whether or not an alternative link configuration is accepted, carrier information for MCS, and information on RLQD threshold.

The serving link base station transmits an alternative link configuration result to the user equipment based on the information received from the candidate base station of the alternative link [S735]. The alternative link configuration result can include carrier information for MCS, information on RLQD threshold, and identifier information of a candidate base station, which has accepted an alternative link.

The user equipment matches timing synchronization with the candidate base station of the alternative link. The user equipment transmits a preamble to the alternative link candidate base station and receives a response in response to the preamble. Yet, the user equipment does not configure an RRC connection.

Maintaining and Updating Searched Alternative Link

FIG. 5 (b) shows a flow for a procedure of updating an alternative link updated by a user equipment.

The user equipment determines whether or not quality of a first alternative link is less than a third threshold value ($A_{MCS\_U}$) [S535].

If the quality of the first alternative link is less than the third threshold value ($A_{MCS\_U}$), the user equipment searches for a second alternative link to replace the first alternative link [S540]. If the second alternative link is searched, the user equipment reports a search result of the second alternative link to the serving link base station and configures an RRC connection of which unicast data transmission/reception is deactivated with a base station of the second alternative link.

If the user equipment detects that the quality of the first alternative link is less than a fourth threshold value ($A_{MCS\_L}$) [S545], the user equipment releases the RRC connection from the base station of the first alternative link [S550]. The user equipment maintains the RRC connection of which unicast data transmission/reception is deactivated with the base station of the second alternative link.

Figure 8:
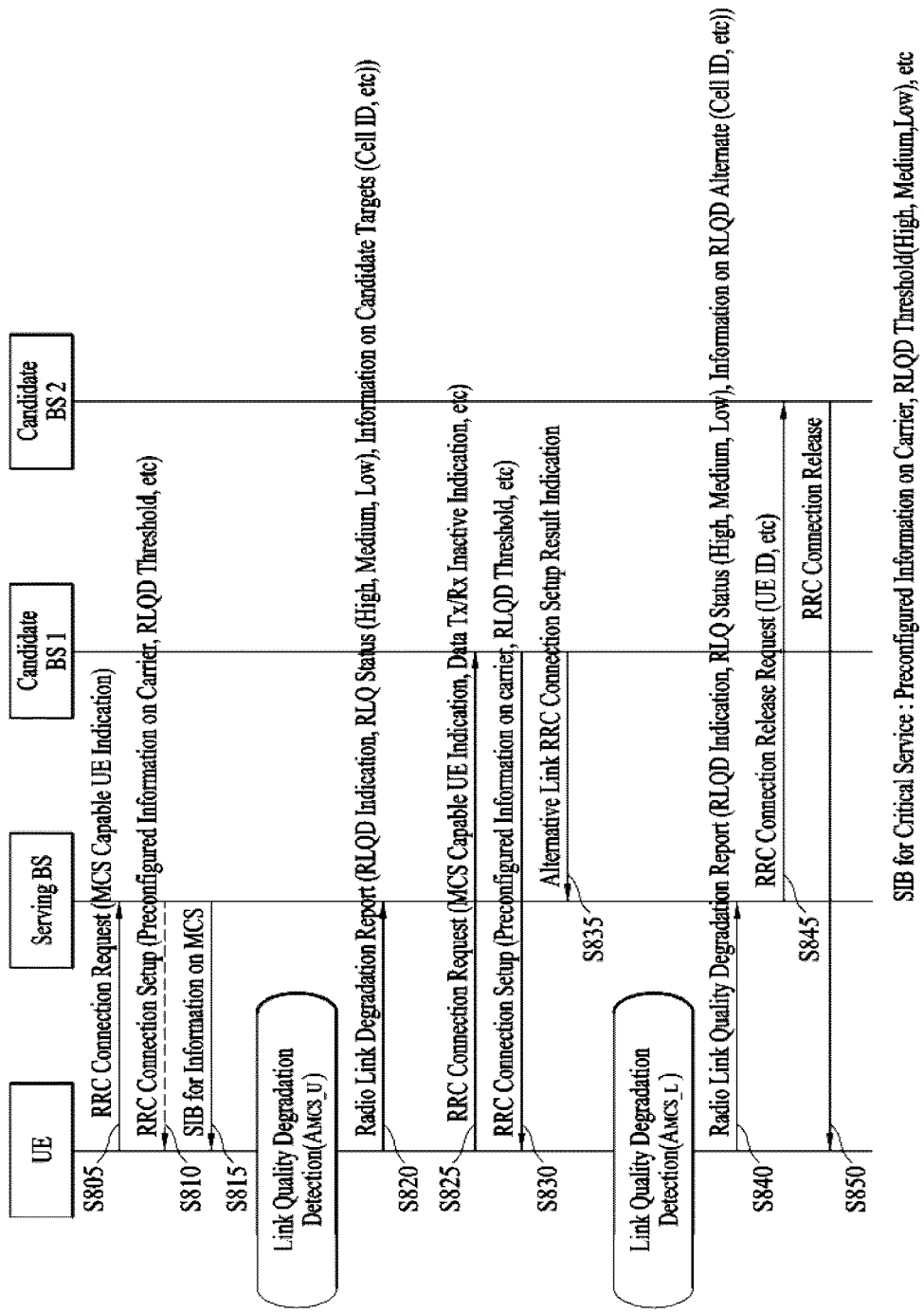
FIG. 8 is a flowchart for an alternative link search procedure of a user equipment according to a further different embodiment of the present invention.

FIG. 8 shows a method for a user equipment to update an alternative link according to a further different embodiment of the present invention. Explanation on contents overlapped with the aforementioned contents is omitted.

The user equipment transmits an RRC connection setup request message to a serving link base station [S805]. The serving link base station transmits an RRC connection setup message to the user equipment [S810].

If serving link quality is equal to or less than a first threshold value ($S_{MCS\_U}$), the user equipment transmits an RLQD report to the serving base station [S820]. The user equipment starts to search for a first alternative link. The RLQD report includes a search result of the first alternative link. If the first alternative link including quality better than quality of the serving link is searched, the user equipment transmits an RRC connection setup request message to a base station of the first alternative link [S825]. The base station of the first alternative link transmits an RRC connection setup message to the user equipment [S830]. The base station of the first alternative link transmits a configuration result of the first alternative link to the serving link base station [S835].

If the quality of the first alternative link is equal to or less than a third threshold ($A_{MCS\_U}$), the user equipment searches for a second alternative link to replace the first alternative link. The user equipment transmits an RLQD report including a search result of the second alternative link to the serving link base station [S840]. The user equipment configures an RRC connection of which unicast data transmission/reception is deactivated with a base station of the second alternative link.

If the quality of the first alternative link is equal to or less than a fourth threshold value ($A_{MCS\_L}$), the user equipment reports the quality to the serving link base station. The serving link base station asks the base station of the first alternative link to release the RRC connection from the user equipment [S845]. The base station of the first alternative link releases the RRC connection from the user equipment [S850].

Figure 9:
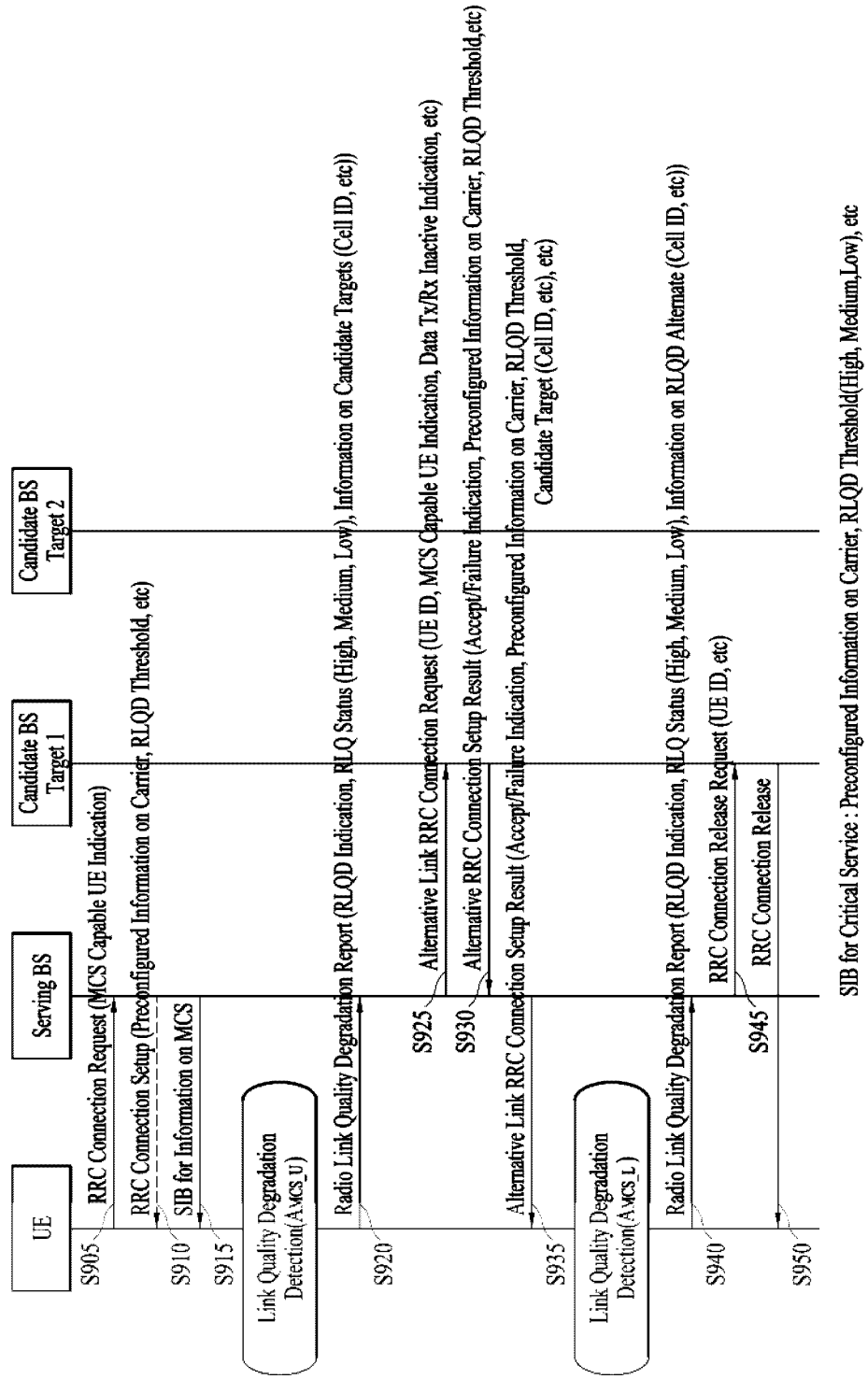
FIG. 9 is a flowchart for an alternative link search procedure of a user equipment according to a further different embodiment of the present invention.

FIG. 9 shows a method for a user equipment to update an alternative link according to a further different embodiment of the present invention. Explanation on contents overlapped with the aforementioned contents is omitted.

In the embodiment of FIG. 8, the user equipment transmits an RRC connection request to a candidate base station to configure an alternative link. In the embodiment of FIG. 9, a serving link base station transmits an alternative link connection request to a candidate base station of an alternative link and transmits a response result to the user equipment in response to the alternative link connection request.

Referring to FIG. 9, the user equipment transmits an RRC connection setup request message to the serving link base station [S905]. The serving link base station transmits an RRC connection setup message to the user equipment [S910]. If serving link quality is equal to or less than a first threshold value ($S_{MCS\_U}$), the user equipment transmits an RLQD report to the serving base station [S920]. The user equipment starts to search for a first alternative link. The RLQD report includes a search result of the first alternative link.

The serving link base station transmits an alternative link configuration request to candidate base stations of the first alternative link based on the RLQD report received from the user equipment [S925]. The alternative link configuration request can include an ID of the user equipment, an indicator indicating that the user equipment corresponds to an MCS capable user equipment, and an indicator indicating a transmission/reception inactivation mode.

The serving link base station receives a response from the candidate base station of the first alternative link in response to the alternative link configuration request [S930]. The response, which is received in response to the alternative link configuration request, can include an indicator indicating whether or not an alternative link configuration is accepted, carrier information for MCS, and information on RLQD threshold.

The serving link base station transmits a first alternative link configuration result to the user equipment based on the information received from the candidate base station of the first alternative link [S935]. The alternative link configuration result can include carrier information for MCS, information on RLQD threshold, and identifier information of a candidate base station, which has accepted the first alternative link.

If the quality of the first alternative link is equal to or less than the third threshold value ($A_{MCS\_U}$), the user equipment searches for a second alternative link to replace the first alternative link. The user equipment transmits an RLQD report including a search result of the second alternative link to the serving link base station [S940].

If the quality of the first alternative link is equal to or less than a fourth threshold value ($A_{MCS\_L}$), the user equipment reports the quality to the serving link base station. The serving link base station asks the base station of the first alternative link to release the RRC connection from the user equipment [S945]. The base station of the first alternative link releases the RRC connection from the user equipment [S950].

Configuring Multiple Connections when User Equipment Performs Initial Access

When a user equipment performs an initial access, procedures for the user equipment to configure a connection with a plurality of base stations are explained. When it is not necessary to match synchronization between a user equipment and base stations (e.g., small cell environment (TA between a user equipment and a base station is close to 0)), following embodiments can be applied to environment in which a new waveform-based asynchronous system is constructed.

In the following embodiments, a base station to which a user equipment attempts to initially access is referred to as a temporary serving base station. The temporary serving base station plays a role of a serving base station in an initial access procedure of the user equipment. Yet, it is not mandatory that the temporary serving base station plays a role of the serving base station of the user equipment after the initial access procedure is completed. After the initial access procedure is completed, the serving base station may become a temporary serving base station or a different base station depending on wireless communication environment. For example, referring to embodiments shown in FIGS. 10 and 12, a temporary serving base station becomes a serving base station of a user equipment as it is. On the contrary, referring to embodiments shown in FIGS. 11 and 13, a different base station rather than a temporary serving base station becomes a serving base station of a user equipment.

Figure 10:
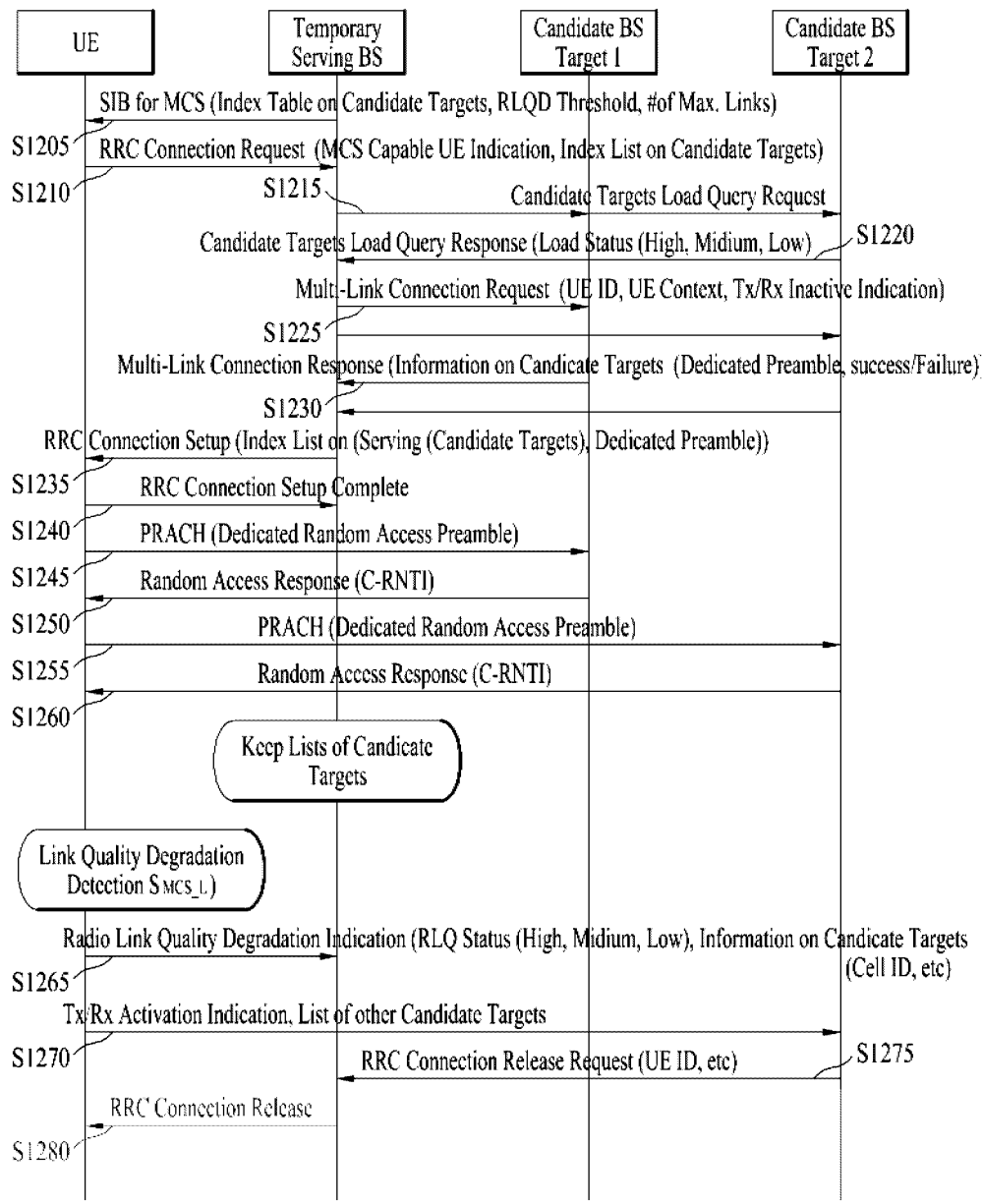
FIG. 10 is a flowchart for an initial access procedure of a user equipment according to one embodiment of the present invention.

FIG. 10 is a flowchart for an initial access procedure of a user equipment according to one embodiment of the present invention.

A user equipment receives system information for MCS from a temporary serving base station [S1205]. The system information may correspond to an SIB (system information block). The system information for MCS can include at least one of an index table for candidate base stations, an RLQD (radio link quality degradation) threshold, and information on the maximum number of links.

The index table for candidate base stations may correspond to an index list of neighboring candidate base stations identified and occupied by the temporary serving base station (e.g., index 1—cell 1, index 2—cell 2, . . . , index n—cell n).

The RLQD threshold corresponds to threshold value information for multi-link access. For example, the RLQD threshold can include information such as a minimum reception signal quality threshold value for finally selecting a serving base station at initial access, a reception signal quality threshold value for searching for an alternative link, a reception signal quality threshold value for releasing a serving link (or alternative link), and the like.

The information on the maximum number of links corresponds to the maximum number of serving links/alternative links capable of being connected at the same time by the user equipment.

The user equipment transmits an RRC connection request message to the temporary serving base station [S1210]. The RRC connection request message can include index list information on the candidate base stations identified by the user equipment according to the minimum reception signal quality threshold value received from the temporary serving base station.

The temporary serving base station transmits a load query request to each of the candidate base stations [S1215].

The temporary serving base station receives a load query response from each of the candidate base stations [S1220]. The load query response can represent a load status of each of the candidate base stations as high, medium, and low for example. The temporary serving base station can determine a candidate base station appropriate for providing MCS to the user equipment in consideration of a load status.

The serving base station transmits a multi-link connection request to a candidate base station in consideration of a load status of each of the candidate base stations [S1225]. For example, the serving base station transmits the multi-link connection request to a candidate base station appropriate for providing MCS to the user equipment. The multi-link connection request can include an identifier of the user equipment (e.g., IMSI, GUTI), a user context (e.g., RRC context, UE context), Tx/Rx inactive indicator, and a serving/candidate indicator. The Tx/Rx inactive indicator indicates whether or not a connection between candidate base stations and the user equipment is configured by a transmission/reception inactive mode. When a temporary base station temporarily accessed by the user equipment is not an actual serving base station of the user equipment, the serving/candidate indicator indicates a candidate base station corresponding to a serving base station of the user equipment and a candidate base station corresponding to a base station of an alternative link.

In the embodiment of FIG. 10, assume that the temporary serving base station corresponds to an actual serving base station of the user equipment. Hence, the temporary serving base station is referred to as a serving base station. Moreover, assume that all candidate base stations have accepted the multi-link connection request. In particular, the candidate base stations become alternative link base stations of the user equipment.

The serving base station receives a multi-link connection response from the candidate base stations [S1230]. The multi-link connection response includes information on the candidate base stations. The multi-link connection response includes C-RNTI and an indicator indicating whether or not the multi-link request is successful. If it is necessary for the user equipment to match synchronization with a candidate base station, the multi-link connection response can further include a user equipment-dedicated preamble.

The serving base station transmits an RRC connection setup message to the user equipment [1235]. The RRC connection setup message can include an index list of the serving or candidate base stations and a list of C-RNTIs received from the candidate base stations. The RRC connection setup message can also include a serving/candidate base station indicator. When the temporary serving base station is not an actual serving base station of the user equipment, the serving/candidate base station indicator indicates a serving base station and a candidate base station. The RRC connection setup message can further include a list of base stations and a list of user equipment-dedicated preambles. The list of base stations may correspond to index information of serving base stations or candidate base stations. The list of user equipment-dedicated preambles may correspond to a list of user equipment-dedicated preambles received from candidate base stations.

The user equipment transmits an RRC connection setup completion message to the serving base station [S1240]. After an RRC connection between the serving base station and the user equipment is configured, the serving base station maintains a list of alternative link base stations.

If synchronization between base stations is not matched, it is necessary for the user equipment to perform synchronization with candidate base stations to configure an alternative link. Hence, the user equipment transmits a random access preamble to candidate base stations with which an alternative link is configured [S1245/S1255]. The user equipment transmits a user equipment-dedicated random access preamble allocated by a first candidate base station to the first candidate base station. The user equipment transmits a user equipment-dedicated random access preamble allocated by a second candidate base station to the second candidate base station. The user equipment receives a random access response message from each of the candidate base stations [S1250/S1260]. The random access response message includes C-RNTI allocated to the user equipment by each of the candidate base stations. If synchronization between base stations is matched, the steps S1245 to S1260 can be omitted.

If radio link quality degradation is detected, the user equipment transmits an RLQD indication message to the serving base station [S1265]. For example, if quality of the serving base station is equal to or less than the $S_{MCS\_L}$, the user equipment transmits the RLQD indication message to the serving base station. The RLQD message can include an RLQ status (e.g., high, medium, low) and information on candidate base stations (e.g., cell ID).

The user equipment transmits a Tx/Rx activation indication and a list of other candidate base stations to a prescribed candidate base station [S1270].

The prescribed candidate base station transmits an RRC connection release request to the serving base station [S1275]. The RRC connection release request can include an identifier of the user equipment.

The serving base station releases an RRC connection from the user equipment [S1280].

Figure 11:
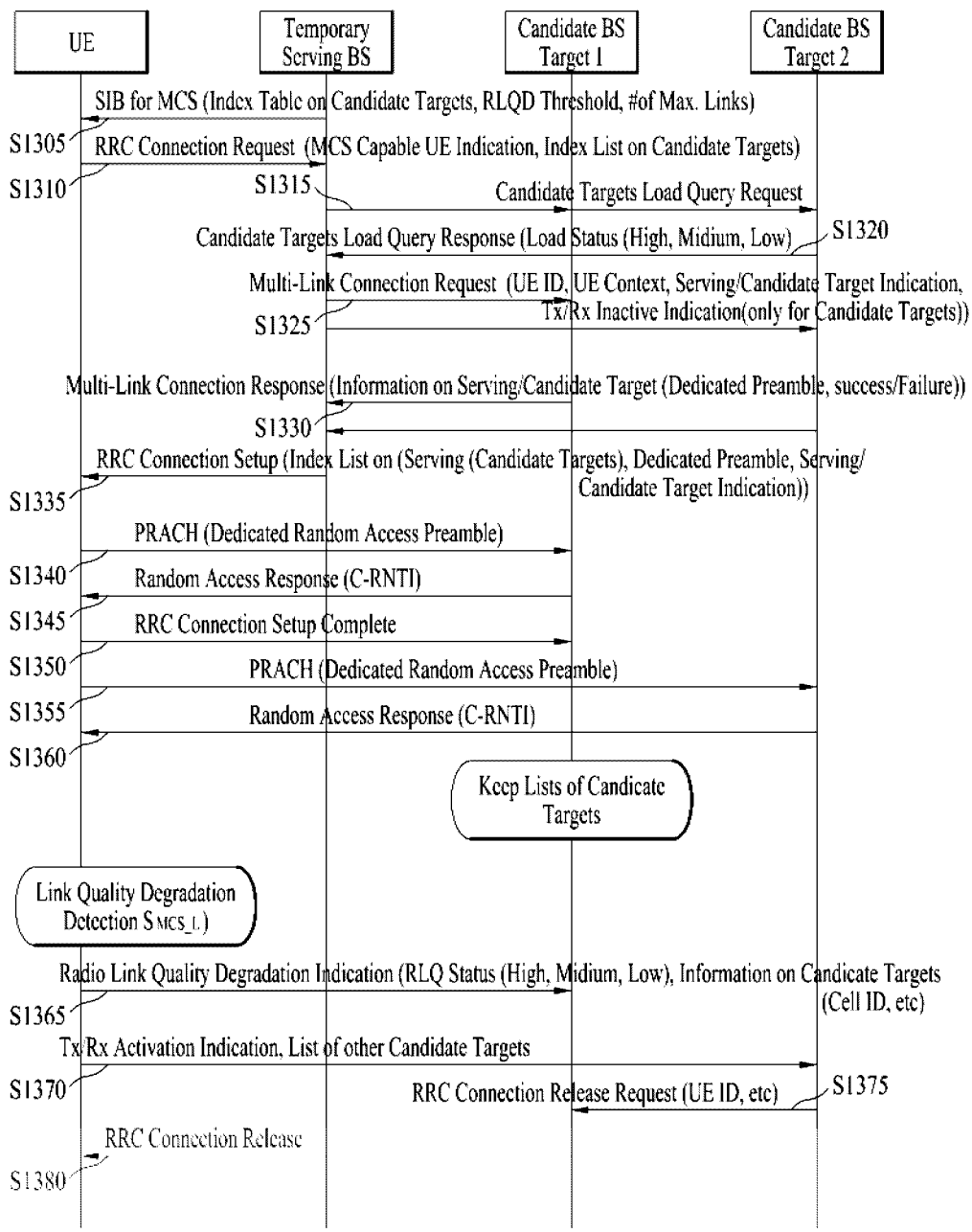
FIG. 11 is a flowchart for an initial access procedure of a user equipment according to a different embodiment of the present invention.

FIG. 11 is a flowchart for an initial access procedure of a user equipment according to one embodiment of the present invention. Explanation on contents overlapped with the aforementioned contents is omitted.

A user equipment receives system information for MCS from a temporary serving base station [S1305]. The user equipment transmits an RRC connection request message to the temporary serving base station [S1310]. The temporary serving base station transmits a load query request to each of candidate base stations [S1315]. The temporary serving base station receives a load query response from each of the candidate base stations [S1320]. The temporary serving base station transmits a multi-link connection request to the candidate base stations in consideration of a load status of each of the candidate base stations [S1325]. The temporary serving base station receives a multi-link connection response from the candidate base stations [S1330].

In the embodiment of FIG. 11, assume that a first candidate base station rather than the temporary serving base station becomes a serving base station of the user equipment. Moreover, assume that all candidate base stations have accepted the multi-link connection request. In particular, the candidate base stations become alternative link base stations of the user equipment.

The temporary serving base station transmits an RRC connection setup message to the user equipment [S1335]. The RRC connection setup message can indicate that the first candidate base station corresponds to the serving base station of the user equipment.

If synchronization between base stations is not matched, it is necessary for the user equipment to perform synchronization with candidate base stations to configure an alternative link or a serving link. Hence, the user equipment transmits a user equipment-dedicated random access preamble to candidate base stations with which an alternative link or a serving link is configured [S1340/S1355]. The user equipment receives a random access response message from each of the candidate base stations [S1345/S1360]. If synchronization between base stations is matched, the synchronization procedure can be omitted.

The user equipment transmits an RRC connection setup completion message to the first candidate base station rather than the temporary serving base station [S1350]. An RRC connection is configured between the first candidate base station and the user equipment. The first candidate base station is referred to as the serving base station.

If radio link quality degradation is detected, the user equipment transmits an RLQD indication message to the serving base station [S1365]. The user equipment transmits a Tx/Rx activation indication and a list of other candidate base stations to a prescribed candidate base station [S1370]. The prescribed candidate base station transmits an RRC connection release request to the serving base station [S1375]. The serving base station releases an RRC connection from the user equipment [S1380].

In the embodiments of FIGS. 10 and 11, the user equipment transmits the RLQD indication message to the serving base station and the user equipment transmits the Tx/Rx activation indication to the alternative link base station. Yet, according to a different embodiment of the present invention, the Tx/Rx activation indication is transmitted to the alternative link base station by the serving base station rather than the user equipment.

Figure 12:
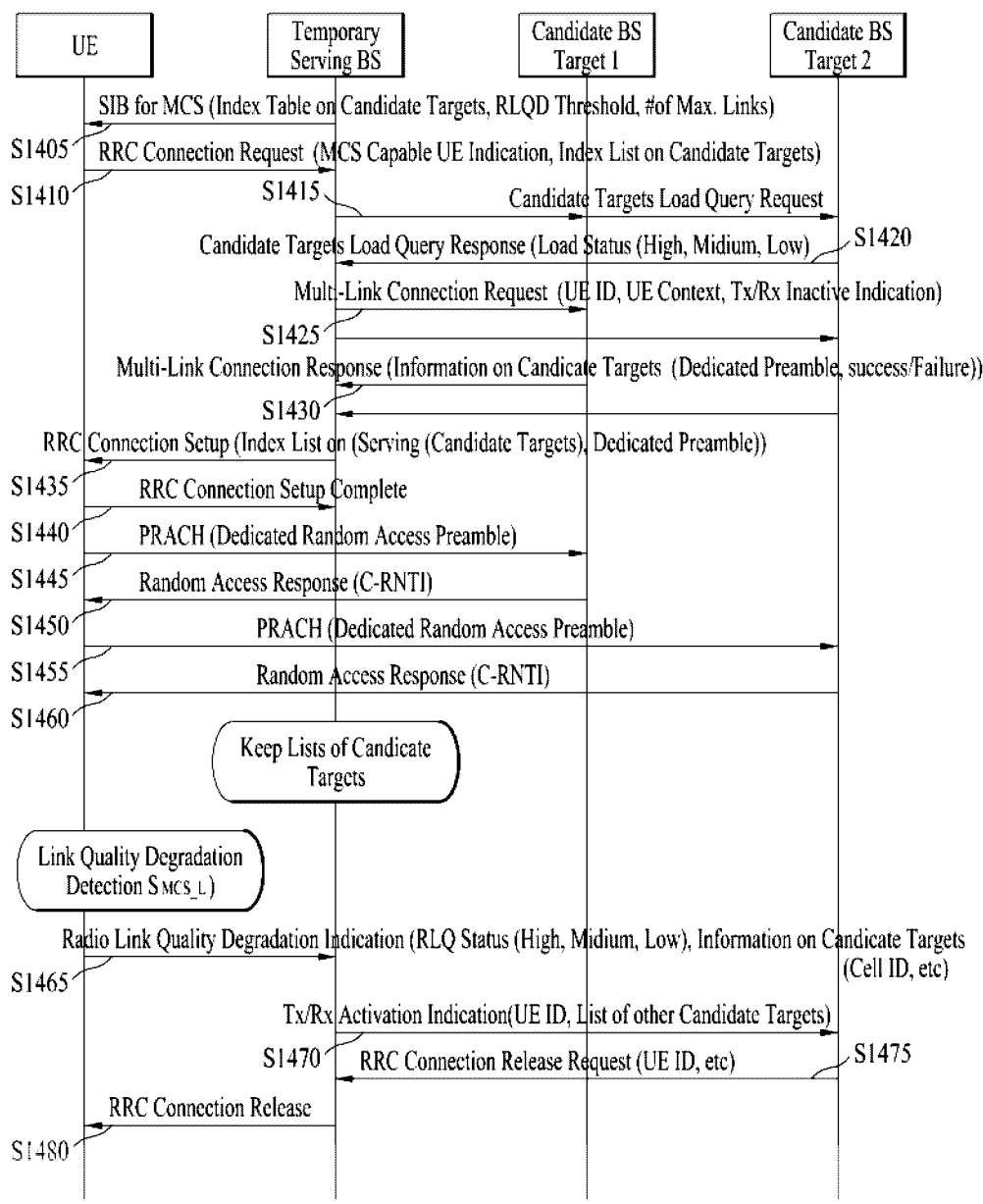
FIG. 12 is a flowchart for an initial access procedure of a user equipment according to a further different embodiment of the present invention.

FIG. 12 is a flowchart for an initial access procedure of a user equipment according to one embodiment of the present invention. Explanation on contents overlapped with the aforementioned contents is omitted.

A user equipment receives system information for MCS from a temporary serving base station [S1405]. The user equipment transmits an RRC connection request message to the temporary serving base station [S1410]. The temporary serving base station transmits a load query request to each of candidate base stations [S1415]. The temporary serving base station receives a load query response from each of the candidate base stations [S1420]. The temporary serving base station transmits a multi-link connection request to the candidate base stations in consideration of a load status of each of the candidate base stations [S1425]. The temporary serving base station receives a multi-link connection response from the candidate base stations [S1430].

In the embodiment of FIG. 12, assume that the temporary serving base station becomes a serving base station of the user equipment. Moreover, assume that all candidate base stations have accepted the multi-link connection request. In particular, the candidate base stations become alternative link base stations of the user equipment.

The temporary serving base station transmits an RRC connection setup message to the user equipment [S1435]. The user equipment transmits an RRC connection setup completion message to the serving base station [S1440].

If synchronization between base stations is not matched, it is necessary for the user equipment to perform synchronization with candidate base stations to configure an alternative link. Hence, the user equipment transmits a user equipment-dedicated random access preamble to candidate base stations with which an alternative link is configured [S1445/S1455]. The user equipment receives a random access response message from each of the candidate base stations [S1450/S1460]. If synchronization between base stations is matched, the steps S1445 to S1460 can be omitted.

If radio link quality degradation is detected, the user equipment transmits an RLQD indication message to the serving base station [S1465].

The serving base station transmits a Tx/Rx activation indication and a list of other candidate base stations to a prescribed candidate base station [S1470]. The prescribed candidate base station transmits an RRC connection release request to the serving base station [S1475]. The serving base station releases an RRC connection from the user equipment [S1480].

Figure 13:
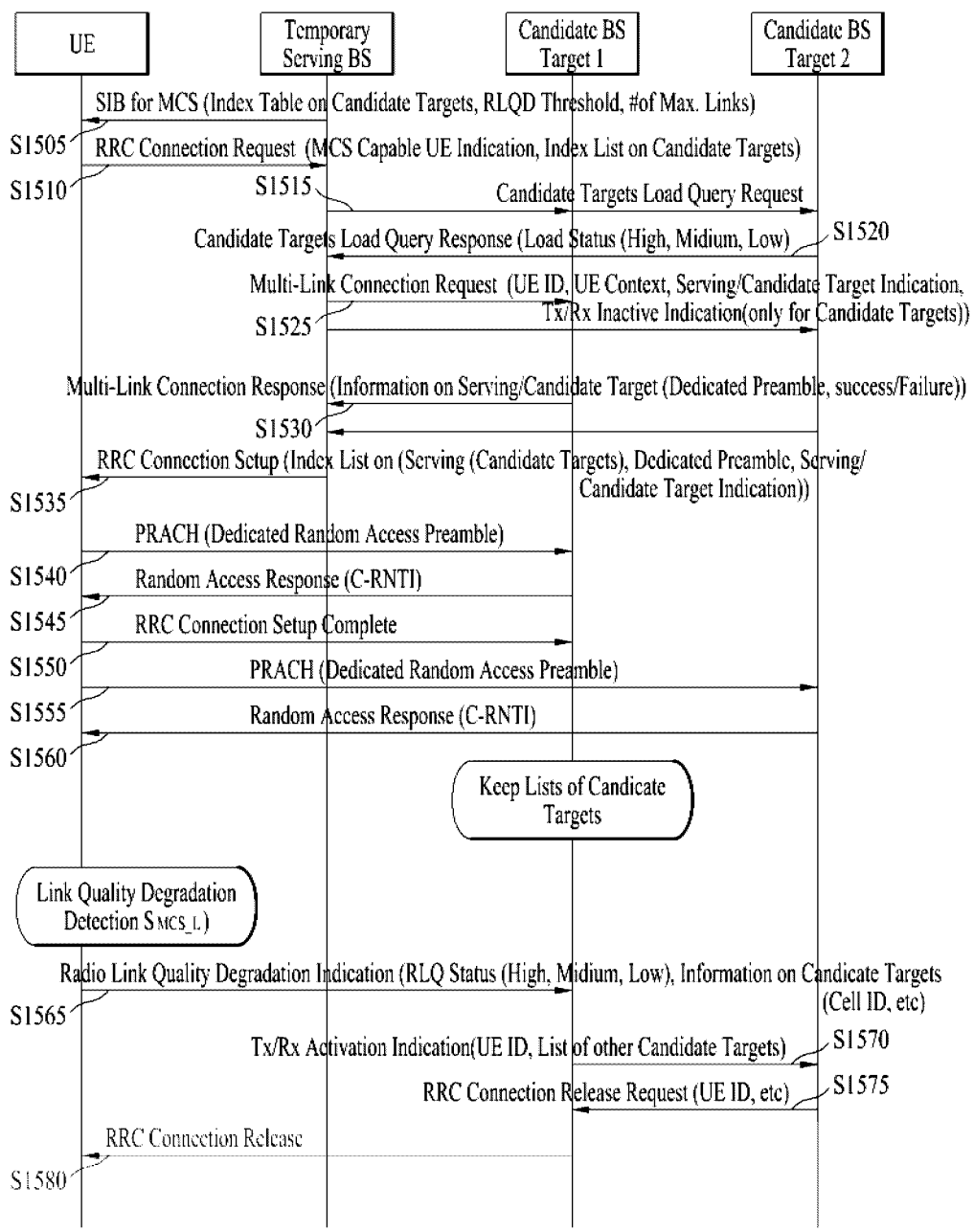
FIG. 13 is a flowchart for an initial access procedure of a user equipment according to a further different embodiment of the present invention.

FIG. 13 is a flowchart for an initial access procedure of a user equipment according to one embodiment of the present invention. Explanation on contents overlapped with the aforementioned contents is omitted.

A user equipment receives system information for MCS from a temporary serving base station [S1505]. The user equipment transmits an RRC connection request message to the temporary serving base station [S1510]. The temporary serving base station transmits a load query request to each of candidate base stations [S1515]. The temporary serving base station receives a load query response from each of the candidate base stations [S1520]. The temporary serving base station transmits a multi-link connection request to the candidate base stations in consideration of a load status of each of the candidate base stations [S1525]. The temporary serving base station receives a multi-link connection response from the candidate base stations [S1530].

In the embodiment of FIG. 13, assume that a first candidate base station rather than the temporary serving base station becomes a serving base station of the user equipment. Moreover, assume that all candidate base stations have accepted the multi-link connection request. In particular, the candidate base stations become alternative link base stations of the user equipment.

If synchronization between base stations is not matched, it is necessary for the user equipment to perform synchronization with candidate base stations to configure an alternative link or a serving link. Hence, the user equipment transmits a user equipment-dedicated random access preamble to candidate base stations with which an alternative link or a serving link is configured [S1545/S1555]. The user equipment receives a random access response message from each of the candidate base stations [S1545/S1560]. If synchronization between base stations is matched, the synchronization procedure can be omitted.

The temporary serving base station transmits an RRC connection setup message to the user equipment [S1535]. The user equipment transmits an RRC connection setup completion message to the first candidate base station corresponding to the serving base station of the user equipment [S1550]. If radio link quality degradation is detected, the user equipment transmits an RLQD indication message to the serving base station [S1565].

The serving base station transmits a Tx/Rx activation indication and a list of other candidate base stations to a prescribed candidate base station [S1570]. The prescribed candidate base station transmits an RRC connection release request to the serving base station [S1575]. The serving base station releases an RRC connection from the user equipment [S1580].

It is impossible to quickly switch to an alternative link using a legacy RLF control method. On the contrary, according to the present invention, it is able to secure an alternative link in advance before reception signal quality is deteriorated by performing a procedure for switching a link before the reception signal quality is deteriorated. If the user equipment is in control of configuring and updating a connection for alternative links, it is able to secure service availability sufficient enough for receiving MCSs. If the user equipment detects a change of a surrounding channel and determines an optimized alternative link via the proposed method, it is able to satisfy both a short delay requirement and a high reliability requirement at the same time. By doing so, it is able to quickly cope with an RLF, implement highly reliable connectivity, and improve a data rate for receiving MCSs.

Figure 14:
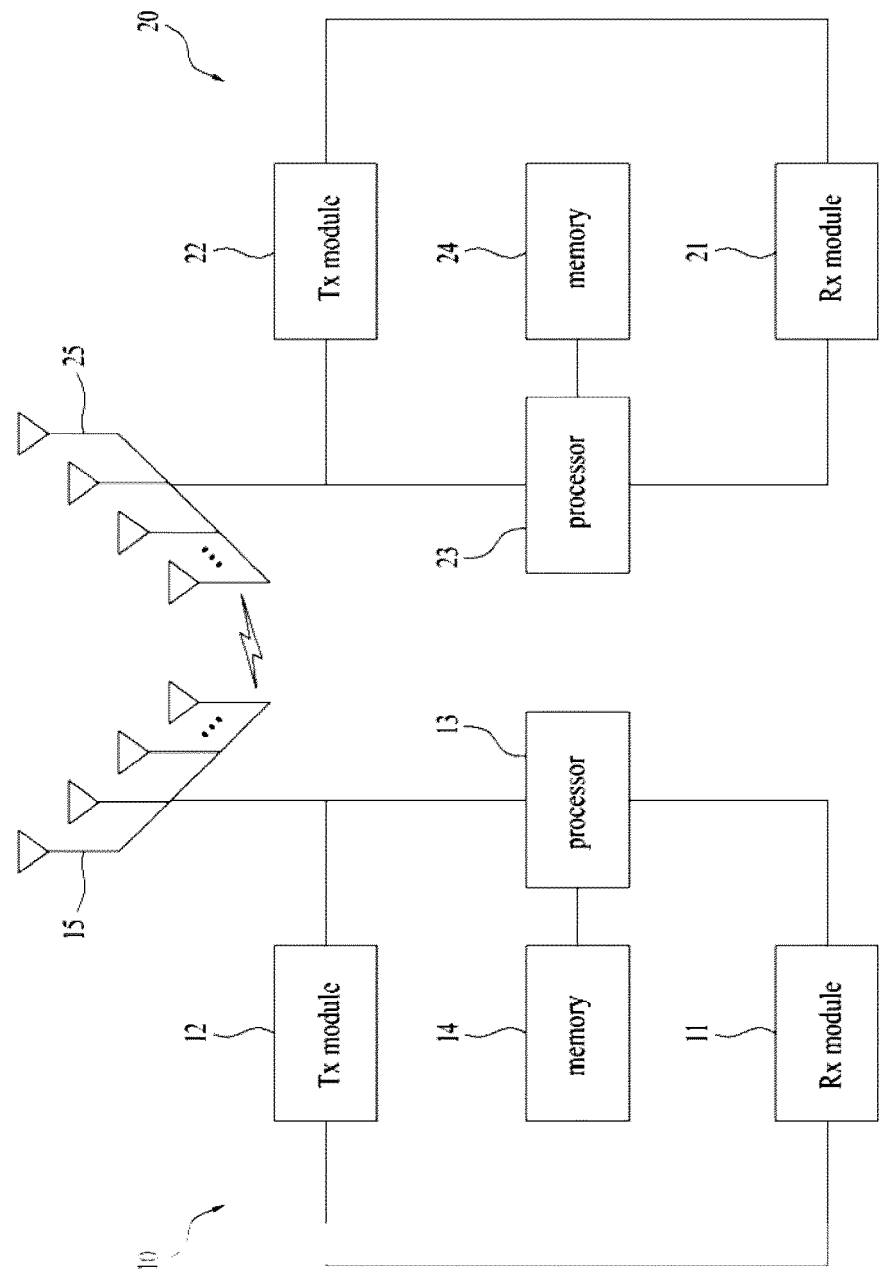
FIG. 14 is a diagram for a user equipment and a base station according to one embodiment of the present invention.

FIG. 14 is a diagram for structures of a user equipment and a base station according to one embodiment of the present invention. The base station may correspond to a fixed cell or a moving cell. Each of the user equipment and the base station shown in FIG. 14 can perform the aforementioned methods.

Referring to FIG. 14, a base station 10 can include a reception module 11, a transmission module 12, a processor 13, a memory 14 and a plurality of antennas 15. A plurality of the antennas 15 correspond to a base station supporting MIMO transmission and reception. The reception module 11 can receive various signals, data and information from the user equipment in UL. The transmission module 12 can transmit various signals, data and information to the user equipment in DL. The processor 13 can control overall operation of base station 10.

The reception module 13 of the base station 10 may operate as a reception module of a backhaul link or a reception module of an access link. The transmission module 12 may operate as a transmission module of a backhaul link or a transmission module of an access link.

Besides, the processor 13 of the base station 10 performs a function of calculating and processing information received by the base station 10, information to be transmitted to the external and the like. The memory 14 can store processed information for prescribed time and can be replaced with such a configuration element as a buffer (not depicted).

Referring to FIG. 14, a user equipment 20 can include a reception module 21, a transmission module 22, a processor 23, a memory 24 and a plurality of antennas 25. A plurality of the antennas 25 correspond to a user equipment supporting MIMO transmission and reception. The reception module 21 can receive various signals, data and information from the base station in DL. The transmission module 22 can transmit various signals, data and information to the base station in UL. The processor 23 can control overall operation of the user equipment 20.

Besides, the processor 23 of the user equipment 20 performs a function of calculating and processing information received by the user equipment 20, information to be transmitted to the external and the like. The memory 24 can store processed information for prescribed time and can be replaced with such a configuration element as a buffer (not depicted).

The embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. Therefore, the present invention is non-limited by the embodiments disclosed herein and intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

As mentioned in the foregoing description, the embodiments of the present invention are applicable to various kinds of mobile communication systems.

What is claimed is:

1. A method of supporting an initial access of a user equipment by a temporary serving base station in a wireless communication system, the method comprising:

broadcasting system information including a plurality of thresholds for a predetermined service, a maximum number of multiple links for the predetermined service, and a list of neighboring base stations of the temporary serving base station;

determining whether or not a user equipment requesting a radio resource control (RRC) connection setup for an initial access supports the predetermined service;

transmitting a request for a report about a load status to candidate base stations to which the user equipment is able to access, when the user equipment supports the predetermined service;

transmitting a request for a multi-connection setup with the user equipment to the candidate base stations according to the report about the load status obtained from the candidate base stations;

determining a base station for setting a serving link with the user equipment based on the response to the request for the multi-connection setup; and transmitting, to the user equipment, an RRC connection setup response message including information about the determined base station for setting the serving link, wherein the plurality of thresholds include at least one of a first threshold related to a quality of the serving link for searching for a first alternative link to replace the serving link, a second threshold related to a quality of the serving link for releasing an RRC connection of the serving link, a third threshold related to a quality of the first alternative link for searching for a second alternative link to replace the first alternative link, or a fourth threshold related to a quality of the first alternative link for releasing an RRC connection of the first alternative link.

2. The method of claim 1, further comprising:

receiving an RRC connection setup request message containing an indicator indicating whether or not the user equipment supports the predetermined service and a list of the candidate base stations to which the user equipment is able to access, wherein the candidate base stations are selected based on the list of the neighboring base stations transmitted by the temporary serving base station.

3. The method of claim 1, wherein the report about the load status indicates a load status of the candidate base stations estimated for a future timing.

4. The method of claim 1, wherein the determining the base station for setting the serving link comprises:

determining a base station having a lowest load status among the candidate base stations which have accepted the request for the multi-connection setup and the temporary serving base station.

5. The method of claim 1, wherein remaining base stations other than the determined base station for setting the serving link among the candidate base stations which have accepted the multi-connection setup request and the temporary serving base station, configure an alternative link with the user equipment in a unicast data transmission/reception inactive mode.

6. The method of claim 5, wherein when quality of the serving link is equal to or less than a threshold, unicast data transmission/reception of the alternative link is activated according to a request of the user equipment or a request of the determined base station for setting the serving link.

7. The method of claim 1, wherein an RRC connection setup completion message of the user equipment is transmitted to the determined base station for setting the serving link with the user equipment in response to the RRC connection setup response message.

8. A temporary serving base station supporting an initial access of a user equipment in a wireless communication system, the temporary serving base station comprising:

a transmitter; and a processor configured to:

control the transmitter to broadcast system information including a plurality of thresholds for a predetermined service, a maximum number of multiple links for the predetermined service, and a list of neighboring base stations of the temporary serving base station, determine whether or not a user equipment requesting a radio resource control (RRC) connection setup for an initial access supports the predetermined service, control the transmitter to transmit a request for a report about a load status to candidate base stations to which the user equipment is able to access, when the user equipment supports the predetermined service, control the transmitter to transmit a request for a multi-connection setup with the user equipment to the candidate base stations according to the report about the load status obtained from the candidate base stations, determine a base station for setting a serving link with the user equipment based on the response to the request for the multi-connection setup, and control the transmitter to transmit an RRC connection setup response message including information about the determined base station for setting the serving link to the user equipment, wherein the plurality of thresholds include at least one of a first threshold related to a quality of the serving link for searching for a first alternative link to replace the serving link, a second threshold related to a quality of the serving link for releasing an RRC connection of the serving link, a third threshold related to a quality of the first alternative link for searching for a second alternative link to replace the first alternative link, or a fourth threshold related to a quality of the first alternative link for releasing an RRC connection of the first alternative link.

* * * * *